(12) United States Patent
Ling et al.

(10) Patent No.: US 12,525,116 B2
(45) Date of Patent: Jan. 13, 2026

(54) STYLUS DETECTION METHOD, APPARATUS, AND TERMINAL DEVICE

(71) Applicant: HUAWEI TECHNOLOGIES CO., LTD., Guangdong (CN)

(72) Inventors: Huabing Ling, Shenzhen (CN); Yang Bi, Wuhan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 104 days.

(21) Appl. No.: 18/397,255

(22) Filed: Dec. 27, 2023

(65) Prior Publication Data

US 2024/0127686 A1 Apr. 18, 2024

Related U.S. Application Data

(63) Continuation of application No. PCT/CN2022/087684, filed on Apr. 19, 2022.

(30) Foreign Application Priority Data

Jun. 29, 2021 (CN) .......................... 202110726723.X

(51) Int. Cl.
*G08B 21/24* (2006.01)
*H04M 1/72409* (2021.01)
*G06F 3/0354* (2013.01)

(52) U.S. Cl.
CPC ........ *G08B 21/24* (2013.01); *H04M 1/72409* (2021.01); *G06F 3/03545* (2013.01)

(58) Field of Classification Search
CPC . G08B 21/24; H04M 1/72409; G06F 3/03545
(Continued)

(56) References Cited

U.S. PATENT DOCUMENTS

| 10,649,713 | B1 * | 5/2020 | Liu | .......................... | G09G 5/02 |
| 2018/0032160 | A1 * | 2/2018 | Park | ..................... | G06F 3/03545 |
| 2020/0319719 | A1 * | 10/2020 | Files | ...................... | G06F 1/1613 |

FOREIGN PATENT DOCUMENTS

| CN | 201345092 Y | 11/2009 |
| CN | 104076876 A | 10/2014 |

(Continued)

OTHER PUBLICATIONS

International Search Report and Written Opinion in International Appln. No. PCT/CN2022/087684, mailed on Jun. 24, 2022, 17 pages (with English translation).

(Continued)

*Primary Examiner* — Naomi J Small
(74) *Attorney, Agent, or Firm* — Fish & Richardson P.C.

(57) ABSTRACT

This application relates to a stylus detection method applied to a terminal device provided with a first area for attaching a stylus. A magnetic attaching component for attaching and fastening the stylus to the first area is disposed in the stylus. An example method includes in response to detecting that an attaching object is attached and fastened to the first area, detecting the attaching object to obtain a detection result, where the detection includes detecting whether an attaching location of the attaching object is accurate. The method further includes in response to determining that the detection result is a target detection result, providing a first prompt to remind a user that the attaching location is inaccurate, where the target detection result includes that the attaching location of the attaching object is inaccurate.

20 Claims, 6 Drawing Sheets

(58) Field of Classification Search
USPC .................................................... 340/539.1
See application file for complete search history.

(56) References Cited

FOREIGN PATENT DOCUMENTS

| | | | |
|---|---|---|---|
| CN | 109542254 A | 3/2019 | |
| CN | 112925426 A | 6/2021 | |
| WO | WO-2018194557 A1 * | 10/2018 | ........... G06F 1/1616 |

OTHER PUBLICATIONS

Extended European Search Report in European Appln. No. 22831361.5, mailed on May 16, 2024, 8 pages.

* cited by examiner

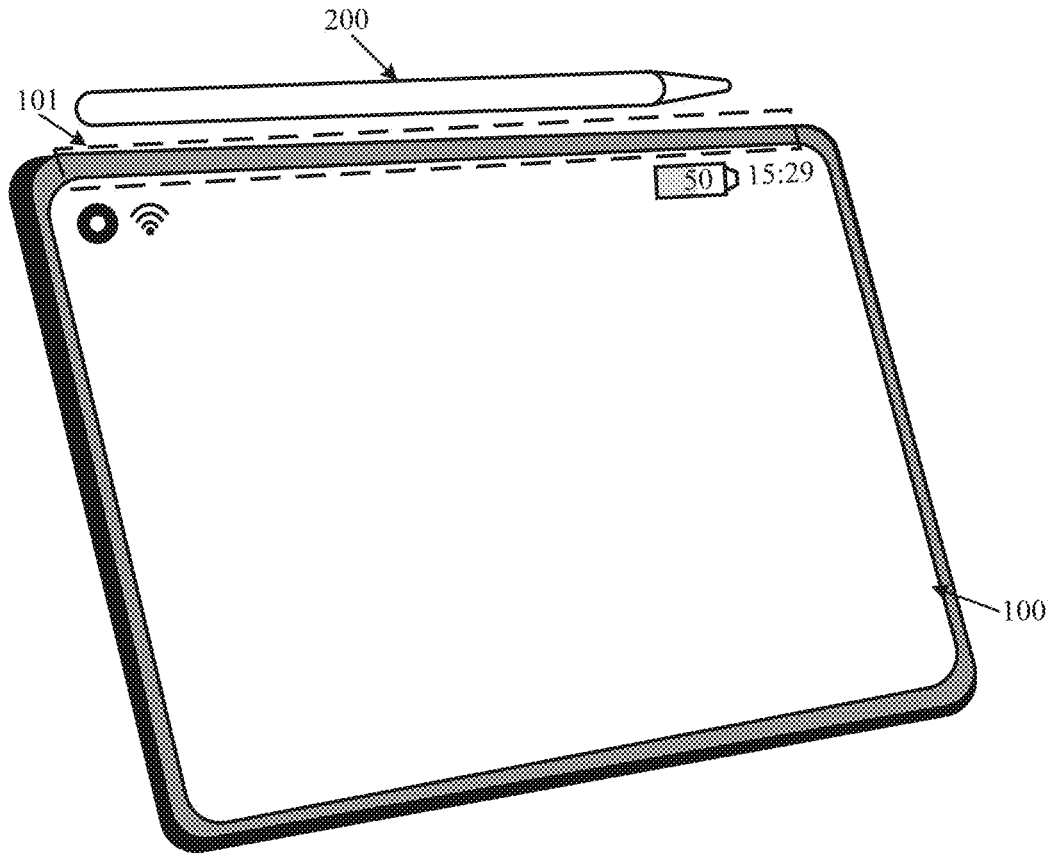

FIG. 1

| When it is detected that an attaching object is attached and fastened to a first area, detect the attaching object to obtain a detection result, where the detection includes detecting whether an attaching location of the attaching object is accurate |—S11|

| When the detection result is a target detection result, provide a first prompt and/or a second prompt, where the target detection result includes that the attaching location of the attaching object is inaccurate; and the first prompt is used to remind a user that the attaching location is inaccurate, and the second prompt is used to remind the user of a correct attaching location of a stylus |—S12|

FIG. 2

STYLUS DETECTION METHOD, APPARATUS, AND TERMINAL DEVICE

CROSS-REFERENCE TO RELATED APPLICATIONS

This application is a continuation of International Application No. PCT/CN2022/087684, filed on Apr. 19, 2022, which claims priority to Chinese Patent Application No. 202110726723.X, filed on Jun. 29, 2021. The disclosures of the aforementioned applications are hereby incorporated by reference in their entireties.

TECHNICAL FIELD

This application relates to the field of computer technologies, and in particular, to a stylus detection method and a terminal device.

BACKGROUND

A stylus is a common electronic product for performing information input and operation on a terminal device such as a tablet computer that may support a touch input. A user may input a text, a graph, and the like on the terminal device by using the stylus. The user first moves the stylus to attach the stylus to the terminal device, and then holds the stylus for use. However, the stylus is attached and fastened to the terminal device through magnetic force, and in a related technology, the terminal device determines whether the stylus is attached through magnetic field intensity. Therefore, a problem of inaccurate determining or even false determining of attaching detection of the stylus exists.

SUMMARY

In view of this, a stylus detection method, an apparatus, and a terminal device are provided.

According to a first aspect, an embodiment of this application provides a stylus detection method, applied to a terminal device. A first area for attaching a stylus is provided on the terminal device, a magnetic attaching component for attaching and fastening the stylus to the first area is disposed in the stylus, and the method includes:
  when it is detected that an attaching object is attached and fastened to the first area, detecting the attaching object to obtain a detection result, where the detection includes detecting whether an attaching location of the attaching object is accurate; and
  when the detection result is a target detection result, providing a first prompt and/or a second prompt, where the target detection result includes that the attaching location of the attaching object is inaccurate, where
  the first prompt is used to remind a user that the attaching location is inaccurate, and the second prompt is used to remind the user of a correct attaching location of the stylus.

According to the first aspect, when it can be rapidly and accurately detected that the attaching object is attached and fastened to the first area, the attaching object attached to the first area is detected, and when the detection result is the target detection result, the first prompt for reminding the user that the attaching location is inaccurate and/or the second prompt for reminding the user of the correct attaching location of the stylus are/is provided.

In a possible implementation, the detection further includes detecting whether the attaching object is the stylus, and the target detection result further includes that the attaching object is the stylus.

In this way, the first prompt and/or the second prompt may be provided when the attaching object is the stylus and the attaching location of the attaching object is inaccurate, so that accuracy of stylus detection is higher.

In a possible implementation, the detection includes a first detection step and a second detection step. The first detection step is used to detect whether the attaching object is the stylus, and the second detection step is used to detect whether the attaching location of the attaching object is accurate. In this way, an execution sequence of the first detection step and the second detection step may not be limited, and only whether the target detection result is achieved is used as a benchmark, so that efficiency of stylus detection can be improved.

In a possible implementation, the second detection step is performed when a first detection result of the first detection step is that the attaching object is the stylus. In this way, after it is determined that the attaching object is the stylus, the second detection step is performed, so that operations performed by the terminal device can be reduced, and processor resources of the terminal device can be saved.

In a possible implementation, the first detection step includes: sending a private message to the attaching object, and monitoring a private reply message returned by the attaching object in response to the private message; and that the attaching object is the stylus includes: receiving the private reply message within a first preset time after the private message is sent. In this way, accuracy of detecting whether the attaching object is the stylus may be improved.

In a possible implementation, the second detection step includes: sending a connection diagnosis message to the attaching object, and monitoring a diagnosis reply message returned by the attaching object in response to the connection diagnosis message, where the connection diagnosis message includes a wireless charging protocol message; and that the attaching location of the attaching object is inaccurate includes: skipping receiving the diagnosis reply message within a second preset time after the connection diagnosis message is sent. In this way, it may be simplified as detecting whether the attaching location of the attaching object is accurate and an operation that needs to be performed by the terminal device.

In a possible implementation, the private message is further used to obtain first location information of the attaching object, and the private reply message includes the first location information of the attaching object; and
  the sending a connection diagnosis message to the attaching object includes:
  determining a relative location relationship between the attaching object and the terminal device based on the first location information; and
  sending the connection diagnosis message to the attaching object when the relative location relationship meets a preset condition.

In a possible implementation, the preset condition includes:
  in a reference coordinate system, a difference between coordinate values in at least one coordinate axis of first location coordinates of the attaching object and second location coordinates of the terminal device is less than or equal to a preset difference, where the first location coordinates are determined based on the first location information received within the first preset time; or an actual spatial location of the attaching object is the same as a predicted spatial location of the stylus, where the actual spatial location is determined based on the first location information received within the first preset time, and the predicted spatial location of the stylus is determined based on second location information of the terminal device and third location information of the first area relative to the terminal device.

In this way, the first location information may indicate the actual spatial location of the attaching object, so that accuracy of stylus detection can be improved based on the determined relative location relationship between the attaching object and the terminal device.

In a possible implementation, providing a first prompt includes at least one of the following operations:
  displaying the first prompt on a display of the terminal device;
  vibrating in a manner corresponding to the first prompt;
  ringing in a manner corresponding to the first prompt;
  flashing in a manner corresponding to the first prompt; and
  playing a voice corresponding to the first prompt; and
  providing a second prompt includes: displaying the second prompt on the display of the terminal device, and/or controlling an indicator light located in the first area to emit light.

In this way, the user may be reminded in various possible manners, so that the user can adjust a stylus location in time to charge or use the stylus, or keep another object or electronic product that is not the stylus away from the terminal device, to prevent the another object or electronic product from interfering with the terminal device.

According to a second aspect, an embodiment of this application provides a stylus detection method, applied to a terminal device. A first area for attaching a stylus is provided on the terminal device, a magnetic attaching component for attaching and fastening the stylus to the first area is disposed in the stylus, and the method includes:
  when it is detected that an attaching object is attached and fastened to the first area, detecting the attaching object to obtain a detection result, where the detection includes detecting whether the attaching object is the stylus; and
  when the detection result is a target detection result, providing a first prompt and/or a second prompt, where the target detection result includes that the attaching object is not the stylus, where
  the first prompt is used to remind a user that the attaching location is inaccurate, and the second prompt is used to remind the user of a correct attaching location of the stylus.

According to a third aspect, an embodiment of this application provides a terminal device. A first area for placing a stylus is provided on the terminal device, a magnetic attaching component for attaching and fastening the stylus to the first area is disposed in the stylus, and the terminal device includes:
  an object detector, disposed at a location that is in the terminal device and that corresponds to the first area, and configured to detect whether an attaching object is attached and fastened to the first area; and
  a processor, configured to implement the foregoing stylus detection method.

According to the fourth aspect, an embodiment of this application provides a non-volatile computer-readable storage medium, where the non-volatile computer-readable storage medium stores computer program instructions; and when the computer program instructions are executed by a processor, the foregoing stylus detection method is implemented.

According to a fifth aspect, an embodiment of this application provides a non-volatile computer-readable storage medium that includes computer-readable code or carries computer-readable code. When the computer-readable code is run in a terminal device, a processor in the terminal device performs the foregoing stylus detection method.

These aspects and other aspects of this application are more concise and more comprehensible in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain the principles of this application.

FIG. 1 is a schematic diagram of an application scenario of a stylus detection method according to an embodiment of this application;

FIG. 2 is a flowchart of a stylus detection method according to an embodiment of this application;

DESCRIPTION OF EMBODIMENTS

Figure 3:
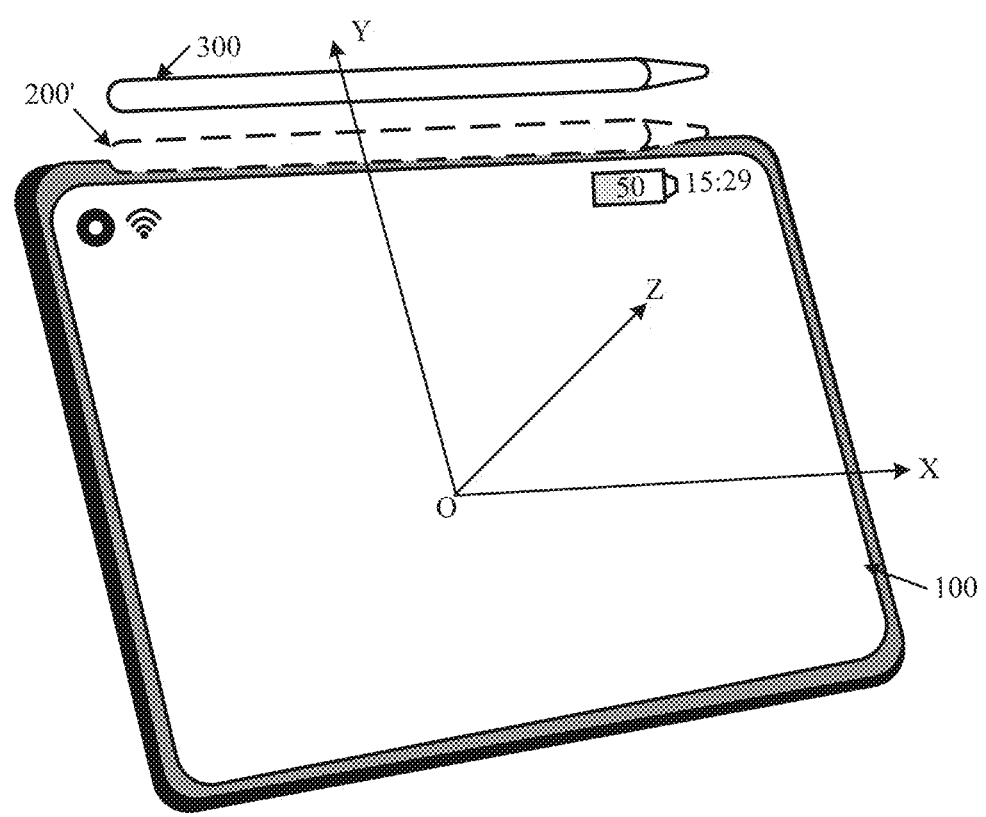
FIG. 3 is a schematic diagram of a detection step of a stylus detection method according to an embodiment of this application.

The following describes various example embodiments, features, and aspects of this application in detail with reference to the accompanying drawings. Identical reference numerals in the accompanying drawings represent elements that have same or similar functions. Although various aspects of embodiments are shown in the accompanying drawings, unless otherwise particularly specified, the accompanying drawings do not need to be drawn to scale.

The specific term "example" herein means "used as an example, embodiment or illustration". Any embodiment described as an "example" herein is not necessarily explained as being superior or better than other embodiments.

In addition, to better describe this application, numerous specific details are given in the following specific implementations. A person skilled in the art should understand that this application can also be implemented without some specific details. In some examples, methods, means, elements, and circuits that are well-known to a person skilled in the art are not described in detail, so that the subject of this application is highlighted.

To resolve the foregoing problem, this application provides a stylus detection method and apparatus, and a terminal device, so that when it can be quickly and accurately detected that an attaching object is attached and fastened to a first area, the attaching object attached to the first area is detected, and a corresponding prompt is provided based on a detection result. FIG. 1 is a schematic diagram of an application scenario of a stylus detection method according to an embodiment of this application. FIG. 2 is a flowchart of a stylus detection method according to an embodiment of this application. FIG. 3 is a schematic diagram of detection of a stylus detection method according to an embodiment of this application.

As shown in FIG. 1, a first area 101 for attaching a stylus is provided on a terminal device 100, and a magnetic component, for example, a magnetic metal strip, is disposed at a location that is in the terminal device 100 or on a surface of the terminal device 100 and that corresponds to the first area 101.

As shown in FIG. 1, at least one magnetic attaching component is disposed in a stylus 200. The magnetic attaching component may attract the magnetic component of the terminal device 100 when the stylus 200 approaches or touches the first area 101, to attach and fasten the stylus 200 to the first area 101. A sensor such as a gyroscope sensor that can perform spatial location detection on the stylus 200 may further be disposed in the stylus 200, to feed first location information of the stylus 200 back to the terminal device. The terminal device 100 and the stylus 200 may be in a Bluetooth communication connection and the like.

As shown in FIG. 1, FIG. 2, and FIG. 3, the method is applied to the terminal device 100, and the method includes step S11 to step S12.

Step S11: When it is detected that an attaching object is attached and fastened to the first area, detect the attaching object to obtain a detection result.

When it is detected that a magnetic field intensity at the first area 101 is within a preset intensity range, it may be determined that an attaching object 300 is attached and fastened to the first area 101.

Various types of styluses may be attached and fastened to the terminal device 100, and the preset intensity range may be set based on a minimum magnetic field intensity and a maximum magnetic field intensity that can be detected by the terminal device 100 when different styluses 200 are attached to the first area 101. The preset intensity range may be a magnetic field intensity range includes the minimum magnetic field intensity and the maximum magnetic field intensity. To be specific, the magnetic field intensity at the first area 101 is greater than or equal to the minimum magnetic field intensity and the magnetic field intensity at the first area 101 is less than or equal to the maximum magnetic field intensity. In this way, it is determined that the attaching object 300 is attached and fastened to the first area 101. Alternatively, the preset intensity range may be a magnetic field intensity range determined based on the minimum magnetic field intensity. To be specific, the magnetic field intensity at the first area 101 is greater than or equal to the minimum magnetic field intensity. In this way, it is determined that the attaching object 300 is attached and fastened to the first area 101.

In a possible implementation, an object detector, for example, a magnetic field sensor such as a Hall effect sensor, may be disposed at a location that is in the terminal device 100 and that corresponds to the first area 101. The magnetic field sensor is used as an example. The magnetic field sensor is configured to detect magnetic field intensity on a part or all of the first area 101, to output a magnetic field detection signal. The terminal device 100 may obtain, based on the magnetic field detection signal, the magnetic field intensity of the first area 101 through analysis, and determine whether the magnetic field intensity of the first area 101 is within the preset intensity range.

Step S12: When the detection result is a target detection result, provide a first prompt and/or a second prompt, where the first prompt is used to remind a user that an attaching location is inaccurate, and the second prompt is used to remind the user of a correct attaching location of the stylus.

"Detection" performed in the step S11, and the target detection result and the provided prompts in the corresponding step S12 may include the following implementations:

First implementation: The detection includes detecting whether an attaching location of the attaching object is accurate. The target detection result includes that the attaching location of the attaching object is inaccurate. In the step S12, the first prompt and/or the second prompt and the first prompt may be provided.

Second implementation: The detection includes detecting whether the attaching location of the attaching object is accurate and detecting whether the attaching object is the stylus, and the target detection result includes that the attaching location of the attaching object is inaccurate and the attaching object is the stylus. In the step S12, the first prompt and/or the second prompt and the first prompt may be provided.

Third implementation: The detection includes detecting whether the attaching object is the stylus, and the target detection result includes that the attaching object is not the stylus. In the step S12, only the second prompt may be provided, or the first prompt and the second prompt may be provided.

In a possible implementation, when the detection result is that an attaching target is the stylus and the attaching location of the stylus is accurate, a third prompt is provided. The third prompt may be used to remind the user that the stylus is in a charging state and/or a connected state.

The detection for the attaching object in the step S11 includes at least one of a first detection step, a second detection step, and a third detection step. When detection steps included in the "detection" are different, execution processes of the stylus detection method in this application are different. The following uses different implementations 1 to 6 of the "detection" as examples for description. For brevity, the following first describes execution processes of the first detection step, the second detection step, and the third detection step, and then describes the implementations 1 to 6 by using examples. If the attaching object is not the stylus, but an object such as a magnet, because the object cannot communicate with the terminal device, detection objectives of steps may be naturally implemented by using the first detection step, the second detection step, and the third detection step. In addition, another electronic product may also implement the detection objective by using at least one of the first detection step, the second detection step, and the third detection step.

The first detection step may include:
sending a private message to the attaching object, and monitoring a private reply message returned by the attaching object in response to the private message. Whether the attaching object is the stylus may be determined based on a monitored response result of the attaching object to the private message.

If the private reply message is received within a first preset time (for example, 5 s, and the first preset time may be greater than or equal to interval duration of returning the private reply message by the attaching object when the attaching object is the stylus) after the private message is sent, and the private message and/or the private reply message meet/meets an expected condition, it may be determined that the attaching object is the stylus. If the private reply message is not received within the first preset time after the private message is sent and/or the received private reply message does not meet the expected condition, it may be determined that the attaching object is not the stylus.

The private message may be a message that can be received and parsed only by different styluses attached to the terminal device. For example, a preset encryption password of the private message may be preset, and the preset encryption password is prestored in the stylus (or a decryption password corresponding to the preset encryption password is stored). Alternatively, a preset encryption password (or a decryption password corresponding to the preset encryption password) may be sent to the stylus for storage after the stylus establishes a communication connection to the terminal device for the first time. In this way, it may be ensured that another electronic product (namely, the attaching object) that is not the stylus cannot respond to the private message, so that accuracy of stylus identification and detection is improved.

Alternatively, the stylus may be preset, so that the private reply message returned by the stylus carries a label that can indicate that the private reply message is from the stylus, for example, a name, a type, and the like of the stylus may be used as the label. In this way, the terminal device may determine, based on the label carried in the private reply message, whether the electronic product (namely, the attaching object) that sends the private reply message is the stylus, so that accuracy of stylus identification and detection is improved.

In this way, the expected condition may include that the private message is encrypted by using the preset encryption password and/or the returned private reply message "carries the label corresponding to the stylus". Otherwise, the expected condition is not met. That the expected condition is not met may be, for example, a label of the private reply message is incorrect, content of the private reply message cannot be parsed, the private reply message is an error message, or the like.

Based on different private message sending manners, the first detection step may include three types: a first sub-detection step, a second sub-detection step, and a third sub-detection step.

The first sub-detection step may include: when it is determined that a Bluetooth connection is not established between the attaching object and the terminal device, sending a private message that meets a first condition to the attaching object, and monitoring a private reply message returned by the attaching object in response to the private message that meets the first condition. The first condition is that the private message is a wireless charging protocol message.

The private message meets the first condition, and therefore, the private reply message may further reflect whether the attaching location of the attaching object is accurate. If the private reply message is received within the first preset time after the private message is sent, and the private message and/or the private reply message meet/meets the expected condition, it may be determined that the attaching object is the stylus and the attaching location of the stylus is accurate. If the private reply message is not received within the first preset time after the private message is sent and/or the received private reply message does not meet the expected condition, it may be determined that the attaching object is not the stylus and the attaching location is also inaccurate.

The second sub-detection step may include: when it is determined that a Bluetooth connection is established between the attaching object and the terminal device, sending a private message to the attaching object through the Bluetooth connection, and monitoring a private reply message returned by the attaching object in response to the private message. The private message is sent through Bluetooth, and therefore the private reply message can only reflect whether the attaching object is the stylus, and whether the attaching location of the attaching object is accurate needs to be further detected and determined.

The third sub-detection step may include: sending a private message that meets a second condition to the attaching object, and monitoring a private reply message returned by the attaching object in response to the private message that meets the second condition. The second condition includes that the private message may further be used to obtain first location information of the attaching object, and the private reply message includes the first location information of the attaching object. Subsequently, a relative location relationship between the attaching object and the terminal device is determined based on the first location information. In this way, when the relative location relationship meets a preset condition, it may be at least preliminarily or directly determined that the attaching object is the stylus. When the relative location relationship does not meet the preset condition, it may be determined that the attaching object is not the stylus. That the relative location relationship meets the preset condition is that the private reply message meets the expected condition.

The preset condition may include: a first preset condition or a second preset condition.

The first preset condition is that in a reference coordinate system, a difference between coordinate values in at least one coordinate axis of first location coordinates of the attaching object and second location coordinates of the terminal device is less than or equal to a preset difference. The first location coordinates are determined based on the first location information received within the first preset time. The preset difference may be 0.

The terminal device may obtain gyroscope data of a gyroscope sensor of the terminal device, and use the gyroscope data group as second location information. Subsequently, second location coordinates (x2, y2, z2) that are of the terminal device 100 and that are in a coordinate system OXYZ shown in FIG. 3 are determined based on the determined second location information. First location coordinates (x1, y1, z1) that are of the attaching object 300 and that are in the coordinate system OXYZ shown in FIG. 3 are determined based on the first location information. However, when the attaching object 300 is the stylus, coordinate values that are of the first location coordinates and the second location coordinates and that are in at least one coordinate axis (for example, an OZ axis in FIG. 3) of the coordinate system OXYZ should be consistent. Therefore, when it is determined that the difference between the coordinate values that are of the first location coordinates and the second location coordinates and that are in the at least one coordinate axis is less than or equal to the preset difference, it may be determined that the relative location relationship meets the first preset condition.

The second preset condition is that an actual spatial location of the attaching object 300 is the same as a predicted spatial location 200' of the stylus. The actual spatial location is determined based on the first location information received within the first preset time, and the predicted spatial location 200' of the stylus is determined based on second location information of the terminal device 100 and third location information of the first area 101 relative to the terminal device 100. The third location information may include a size of the first area 101, a location of any point such as a center of the first area 101 on the terminal device 100, and the like. The actual spatial location of the attaching object 300 may be determined based on the first location information. The actual spatial location may be a spatial location of any point on the attaching object such as a center of the attaching object 300, or may be a spatial location set that can represent a location of each point on the attaching object in space.

For example, as shown in FIG. 3, the terminal device 100 may determine an actual spatial location of the terminal device 100 based on the second location information, for example, second location coordinates (x2, y2, z2) of a point such as a center of the terminal device 100 in the coordinate system OXYZ. Then, when the stylus is attached to the first area 101, a predicted stylus spatial location 200' (x0, y0, z0) corresponding to the attached stylus may be predicted based on the third location information of the first area 101. Then, the first location coordinates (x1, y1, z1) (namely, the actual spatial location of the attaching object 300) that are of the attaching object 300 and that are in the coordinate system OXYZ shown in FIG. 3 are determined based on the first location information. If (x1, y1, z1) is the same as (x0, y0, z0), it is determined that the relative location relationship meets the second preset condition. That (x1, y1, z1) is the same as (x0, y0, z0) may mean x1=x0±δ0, y1=y0±δ1, and z1=z0±δ2. δ0, δ1, and δ2 are allowable errors when the stylus is attached and fastened to the first area 101.

In a possible implementation, the first location information can indicate the actual spatial location of the attaching object, so that when the first location information can meet a detection standard for the attaching location of the attaching object, whether the attaching location of the attaching object is accurate may be further determined based on the first location information. In this case, if it is determined that the relative location relationship meets the preset condition, whether the attaching object is the stylus may be determined, and that the attaching location of the stylus is accurate may also be determined.

The second detection step may include: sending a connection diagnosis message to the attaching object 300, and monitoring a diagnosis reply message returned by the attaching object 300 in response to the connection diagnosis message. The connection diagnosis message includes a wireless charging protocol message. The wireless charging protocol includes a Qi protocol (a "wireless charging" standard launched by a wireless power consortium (Qi)), a PMA (Power Matters Alliance) protocol, an A4WP (Alliance for Wireless Power) protocol, and the like. The connection diagnosis message may be a ping message (a communication connection detection packet), and the like. The terminal device 100 may determine, based on a monitored response result of the attaching object for the connection diagnosis message, whether the attaching location of the attaching object is accurate, to further determine whether a communication connection and/or a connection required for charging between the attaching object and the terminal device are normally connected.

If the diagnosis reply message is not received within the second preset time after the connection diagnosis message is sent, it may be determined that the attaching location of the attaching object is inaccurate. If the diagnosis reply message is received within the second preset time after the connection diagnosis message is sent, it may be determined that the attaching location of the attaching object is inaccurate. The second preset time may be 5 s or the like, and the second preset time may be greater than or equal to interval duration of the reply message returned by the attaching object when the attaching object is the stylus.

The third detection step may include: The terminal device may obtain a target detection signal sent by a target sensor. Further, it may be determined, based on the target detection signal, whether the attaching object is the stylus and/or whether the attaching location of the attaching object is inaccurate.

"Detection" implementation 1: "Detection" includes a first detection step and a second detection step. The second detection step is performed when a first detection result of the first detection step is that the attaching object is the stylus.

Figure 4:
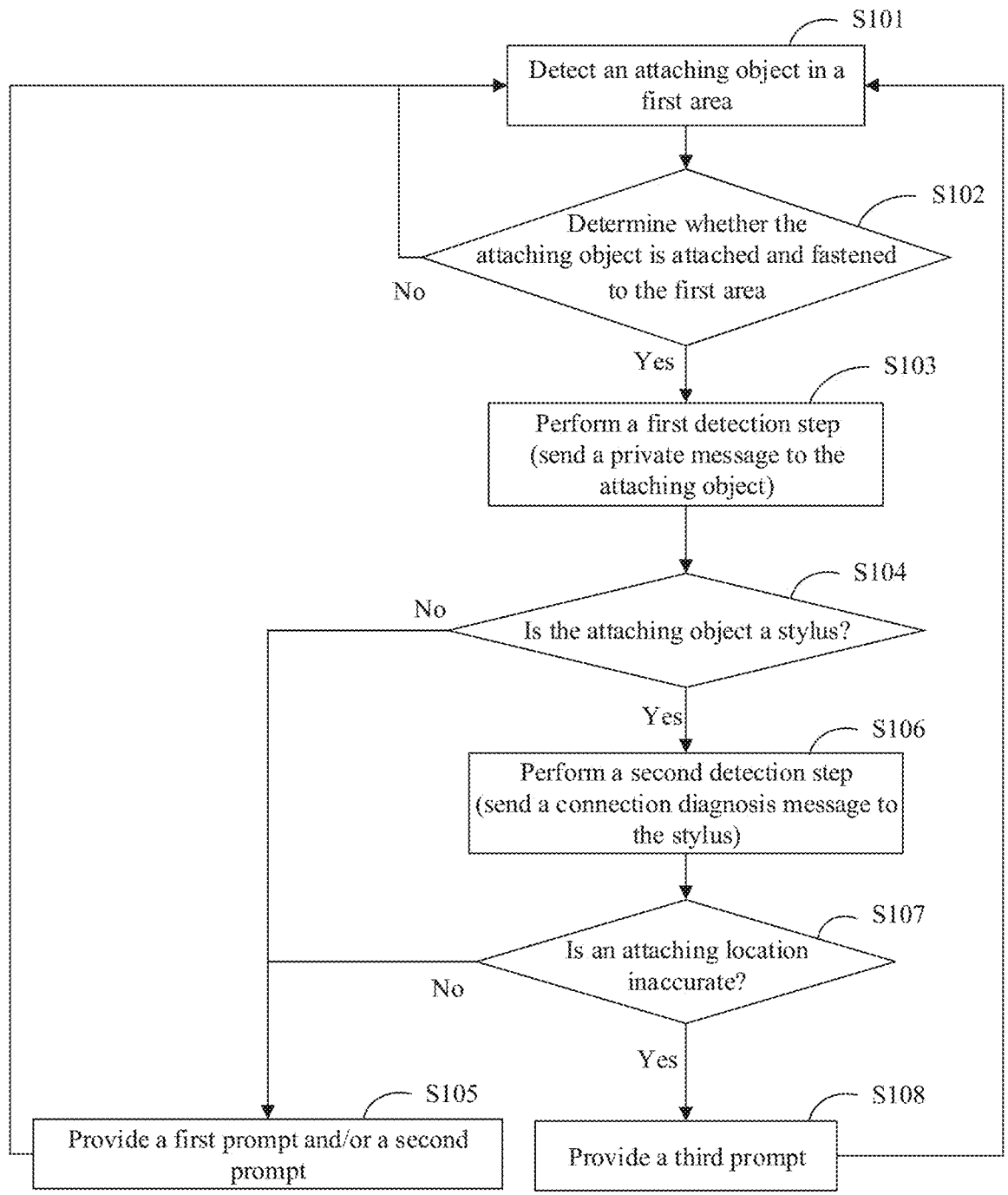
FIG. 4 is a schematic diagram of a stylus detection method corresponding to a "detection" implementation 1 according to an embodiment of this application.

FIG. 4 is a schematic diagram of a stylus detection method corresponding to a "detection" implementation 1 according to an embodiment of this application. As shown in FIG. 4, the method for implementing stylus detection by using the "detection" implementation 1 includes step S101 to step S108.

Step S101: Detect an attaching object in a first area. For a manner of detecting the attaching object, refer to the foregoing manner of determining whether the magnetic field intensity of the first area is within the preset intensity range.

Step S102: Determine whether the attaching object is attached and fastened to the first area 101. Step S103 is performed when the attaching object is attached and fastened to the first area. When no attaching object is attached and fastened to the first area 101, step S101 continues to be performed.

Step S103: Perform a first detection step. The first detection step may be any one of the foregoing first sub-detection step, second sub-detection step, and third sub-detection step.

Step S104: Determine whether the attaching object is a stylus.

When the first detection step is the first sub-detection step, because a private message meets a first condition, a private reply message may further reflect whether an attaching location of the attaching object is accurate. If the private reply message is received within a first preset time after the private message is sent, and the private message and/or the private reply message meet/meets an expected condition, it may be determined that the attaching object is the stylus and the attaching location of the stylus is accurate, and step S108 may be directly performed. If the private reply message is not received within the first preset time after the private message is sent and/or the received private reply message does not meet the expected condition, it may be determined that the attaching object is not the stylus and the attaching location is also inaccurate, and step S105 may be directly performed.

When the first detection step is the second sub-detection step, if the private reply message is received within the first preset time after the private message is sent, and the private message and/or the private reply message meet/meets the expected condition, it may be determined that the attaching object is the stylus, and step S106 continues to be performed. If the private reply message is not received within the first preset time after the private message is sent and/or the received private reply message does not meet the expected condition, it may be determined that the attaching object is not the stylus, and step S105 continues to be performed.

When the first detection step is the third sub-detection step, if the private reply message is received within the first preset time after the private message is sent, and the private message and/or a relative location relationship determined based on the private reply message meet/meets a preset condition, it may be determined that the attaching object is the stylus, and step S106 continues to be performed. If the private reply message is not received within the first preset time after the private message is sent and/or a relative location relationship determined based on the received private reply message does not meet a preset condition, it may be determined that the attaching object is not the stylus, and step S105 continues to be performed.

Step S105: Provide a first prompt and/or a second prompt corresponding to the first detection step.

When the first detection step is the second sub-detection condition or the third sub-detection step, the second prompt may be provided in step S105. When the first detection step is the first sub-detection step, the first prompt and/or the second prompt may be provided in step S105.

Step S106: Further perform the second detection step when it is determined that the attaching object is the stylus, to further perform step S107 in which whether the attaching location of the stylus is accurate.

Step S107: Determine whether the attaching location of the stylus is accurate. If a diagnosis reply message is not received within a second preset time after a connection diagnosis message is sent, it may be determined that the attaching location of the attaching object is inaccurate, and step S105 may continue to be performed. If the diagnosis reply message is received within the second preset time after the connection diagnosis message is sent, it may be determined that the attaching location of the attaching object is inaccurate, and step S108 may continue to be performed.

Step S108: Provide a third prompt.

The third prompt is further used to remind a user that the stylus is in a charging state and/or a to-be-used state.

In a possible implementation, providing a third prompt may include at least one of the following operations: displaying the third prompt on a display of the terminal device; vibrating in a manner corresponding to the third prompt; ringing in a manner corresponding to the third prompt; emitting light in a manner corresponding to the third prompt, for example, light flashing; and playing a voice corresponding to the third prompt.

Figure 5:
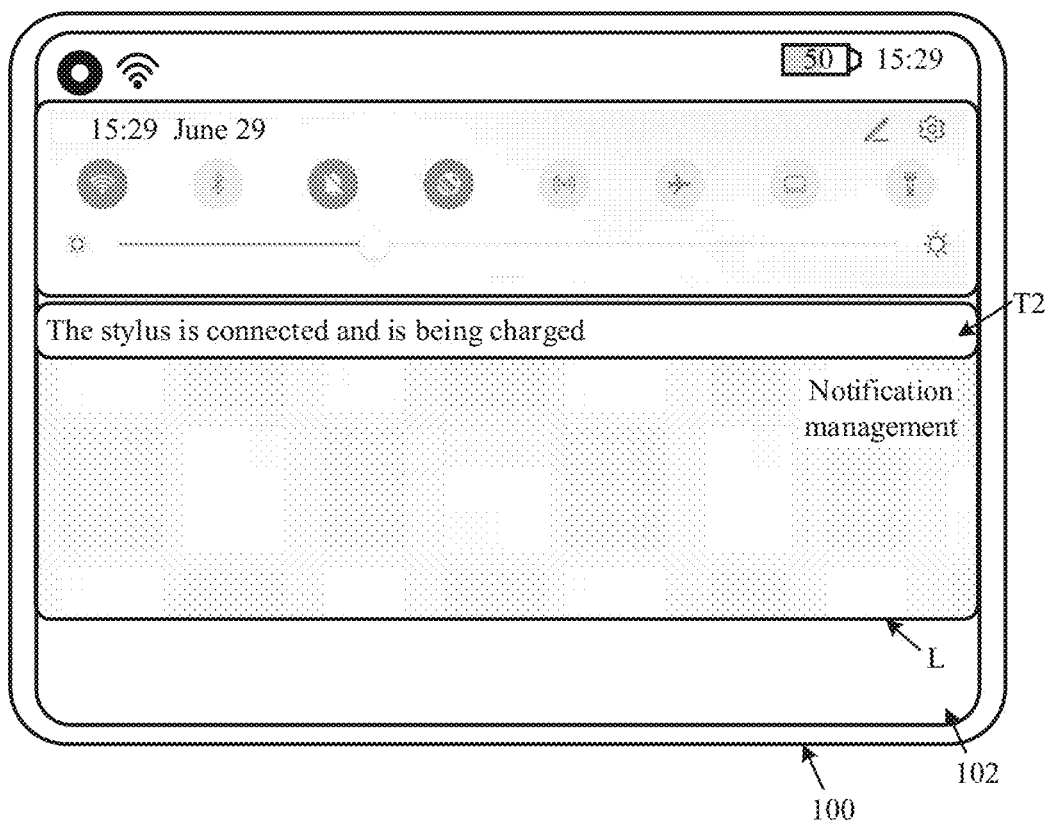
FIG. 5 is a schematic diagram of a third prompt according to an embodiment of this application.

FIG. 5 is a schematic diagram of a third prompt according to an embodiment of this application. As shown in FIG. 5, after determining that the attaching object is a stylus and the attaching location of the stylus is accurate, when the terminal device 100 is in an unlocked state or a non-unlocked state, the terminal device may display a notification bar L on a display 102 of the terminal device 100, and display the third prompt T3 on the notification bar L. A user may be notified that the stylus is normally connected, may be used, and is in a charging state by using a text such as "stylus is connected and is charging" in T3. Alternatively, when the terminal device 100 is in the unlocked state, the third prompt may be directly displayed in a form such as a pop-up window in an interface currently displayed to the user.

Vibration, ringing, and light emitting (for example, implemented by using a flash light by flashing) that correspond to an accurate attaching prompt may be performed according to a user setting or a default setting of the terminal device. A voice corresponding to the accurate attaching prompt may be a prompt such as "stylus is connected and is charging".

In a possible implementation, a first prompt may include at least one of the following operations: displaying the first prompt on a display of the terminal device; vibrating in a manner corresponding to the first prompt; ringing in a manner corresponding to the first prompt; flashing (for example, flashing by using the flash light) in a manner corresponding to the first prompt; and playing a voice corresponding to the first prompt.

In a possible implementation, a second prompt includes: displaying the second prompt on the display of the terminal device, and/or controlling an indicator light located in the first area to emit light. For example, a strip indicator light may be installed in the first area, and the strip indicator is controlled to continuously emit light or blink, so that the user can determine a location of the first area based on a light-emitting location.

Figure 6:
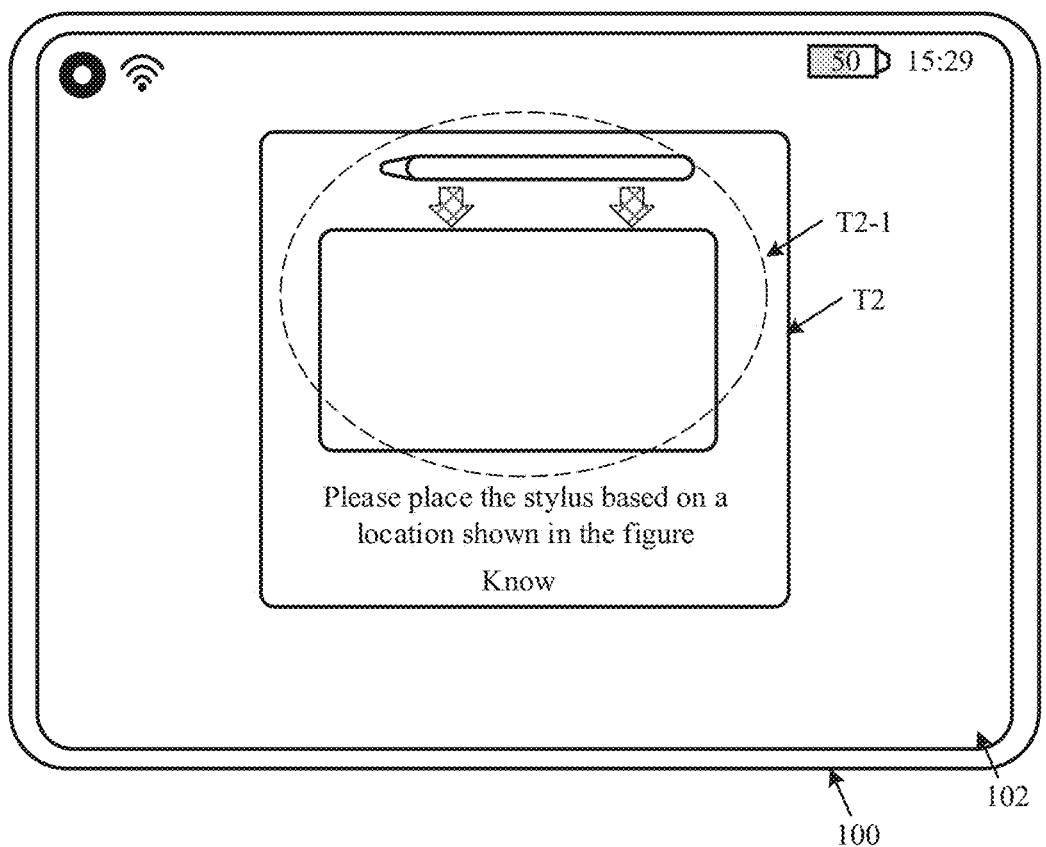
FIG. 6 is a schematic diagram of a second prompt according to an embodiment of this application.

FIG. 6 is a schematic diagram of a second prompt according to an embodiment of this application. As shown in FIG. 6, after determining that the first prompt and the second prompt need to be provided, when the terminal device 100 is in an unlocked state or a non-unlocked state, the terminal device may display the second prompt T2 in a form such as a pop-up window on a display 102 of the terminal device 100. In T2, a user may be reminded by using a text such as "Please place the stylus based on a location shown in the figure" and a picture or a gif (the gif is not shown in the figure) in T2-1.

Implementations of the operation of providing the first prompt and the operation of providing the third prompt are similar, and may be set with reference to the foregoing description. Details are not described herein again.

It may be understood that implementations of the first prompt, the second prompt, and the third prompt are not limited to the foregoing examples, and may further include other manners. A person skilled in the art may set implementations of an accurate attaching prompt and a location adjustment prompt based on an actual requirement. This is not limited in this application.

"Detection" implementation 2: "Detection" includes a first detection step and a second detection step. In addition, an execution sequence of the first detection step and the second detection step is not limited. The first detection step and the second detection step may be performed simultaneously or sequentially.

Regardless of the execution sequence of the first detection step and the second detection step, and a specific sub-detection step (to be specific, any one of the first sub-detection step, the second sub-detection step, and the third sub-detection step) specifically used in the first detection step, the first prompt and/or the second prompt may be provided as long as it is determined that the attaching location of the attaching object is inaccurate and/or the attaching object is not the stylus. When it is determined that the attaching object is the stylus and the attaching location of the stylus is accurate, the third prompt may be provided.

"Detection" implementation 3: "Detection" includes only a third detection step. Therefore, the first prompt and/or the second prompt may be provided as long as it is determined that the attaching location of the attaching object is inaccurate and/or the attaching object is not the stylus. When it is determined that the attaching object is the stylus and the attaching location of the stylus is accurate, the third prompt may be provided. In this way, detection on the attaching object may be implemented by using only an independently disposed target sensor.

"Detection" implementation 4: "Detection" includes a first detection step, a second detection step, and a third detection step, where the second detection step is performed when a first detection result of the first detection step is that the attaching object is the stylus, and the third detection step is performed after the second detection step determines that the attaching location is accurate.

Some steps of the "detection" implementation 4 are the same as some steps of the "detection" implementation 1, and for a same part, refer to the foregoing description. Details are not described herein again. A difference between the "detection" implementation 4 and the "detection" implementation 1 lies in that:

After step S107, the third detection step further needs to be performed, and when it is determined, by using the third detection step, that the attaching location is accurate, step S108 continues to be performed. When it is determined, by using the third detection step, that the attaching location is inaccurate, step S105 continues to be performed.

"Detection" implementation 5: "Detection" includes a first detection step, a second detection step, and a third detection step, where the third detection step is performed when a first detection result of the first detection step is that the attaching object is the stylus, and the second detection step is performed after the third detection step determines that the attaching location is accurate. Some steps of the "detection" implementation 5 are the same as some steps of the "detection" implementation 1, and for a same part, refer to the foregoing description. Details are not described herein again. A difference between the "detection" implementation 5 and the "detection" implementation 1 lies in that:

After step S104, the third detection step is performed, and when it is determined, by using the third detection step, that the attaching location is accurate, step S106 continues to be performed. When it is determined, by using the third detection step, that the attaching location is inaccurate, step S105 continues to be performed.

"Detection" implementation 6: "Detection" includes a first detection step, a second detection step, and a third detection step, where the third detection step is performed when a first detection result of the first detection step is that the attaching object is the stylus, and the second detection step is performed after the third detection step determines that the attaching object is the stylus. Some steps of the "detection" implementation 6 are the same as some steps of the "detection" implementation 1, and for a same part, refer to the foregoing description. Details are not described herein again. A difference between the "detection" implementation 6 and the "detection" implementation 1 lies in that:

After step S104, the third detection step is performed, and when it is determined, by using the third detection step, that the attaching object is the stylus, step S106 continues to be performed. When it is determined, by using the third detection step, that the attaching object is not the stylus, step S105 continues to be performed.

In the "detection" implementation 4, the "detection" implementation 5, and the "detection" implementation 6, whether the attaching location is accurate or whether the attaching object is the stylus is detected for a second time by using the third detection step, thereby further improving accuracy of stylus detection.

It may be understood that, a person skilled in the art may set, based on the first detection step and the second detection step, and results obtained after the second detection step is detected, with reference to the foregoing examples in the "detection" implementation 1 to the "detection" implementation 6, detection steps included in the "detection" in the stylus detection method, an execution sequence and a condition between detection steps, a target detection result, and the like. This is not limited in this application.

In this application, after providing the third prompt, the terminal device may continue to monitor a connection status between the stylus and the terminal device, and provide corresponding prompts based on different connection statuses. For example, when it is not detected that duration of an operation on the stylus exceeds waiting duration, a prompt indicating that the stylus is about to be disconnected may be provided, to remind the user that the stylus has not been used for a long time and a communication connection to the stylus is about to be disconnected. When it is detected that a battery level of the stylus is low and the stylus is about to be powered off, a low battery prompt may be provided to remind the user that the stylus is about to be powered off due to the low battery level, so that the user can charge the stylus in time, and the like.

Figure 7:
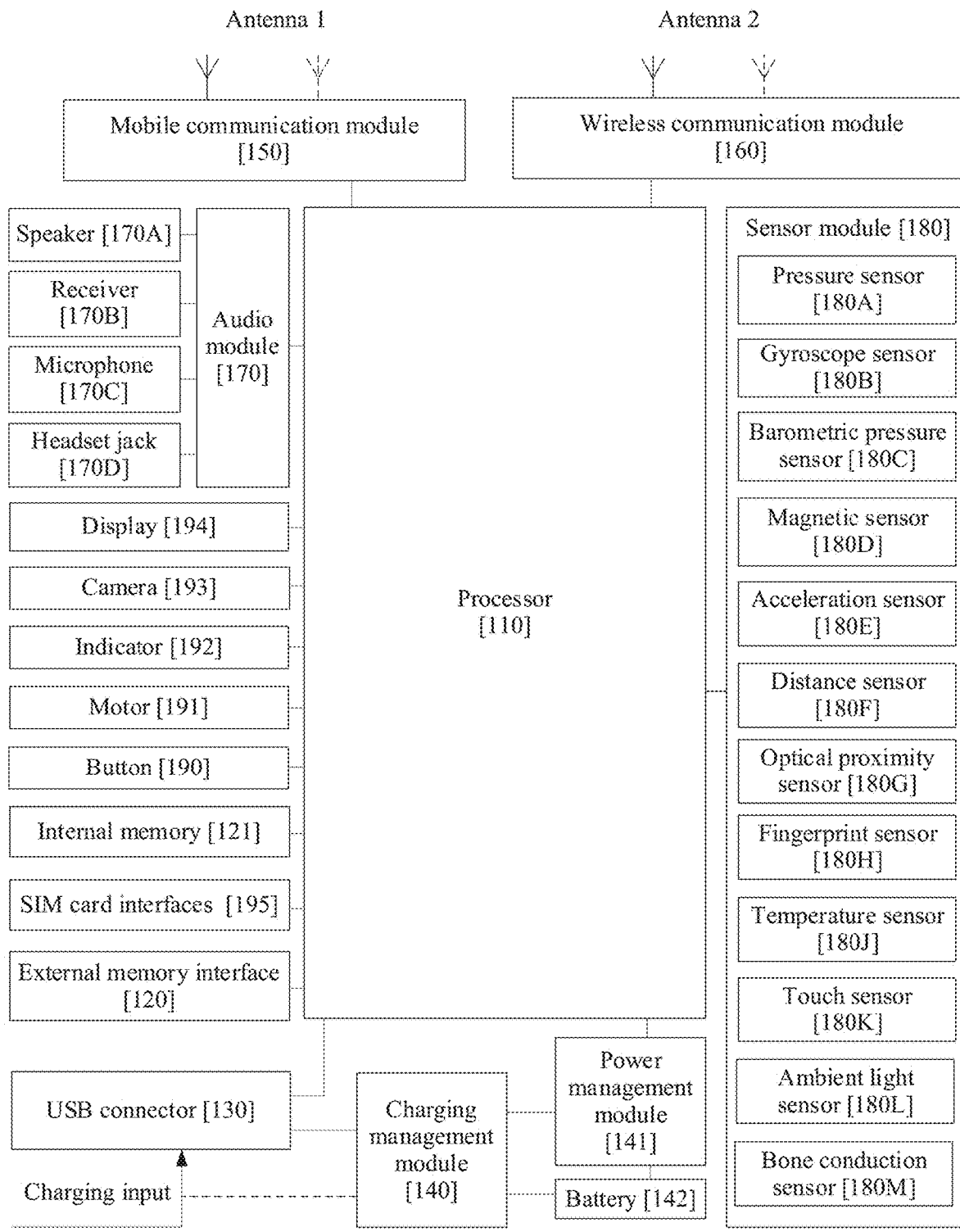
FIG. 7 is a schematic diagram of a structure of a terminal device 100.

FIG. 7 is a schematic diagram of a structure of a terminal device 100.

The terminal device 100 may include at least one of a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an artificial intelligence (AI) device, an in-vehicle device, a smart home device, or a smart city device. A specific type of the terminal device 100 is not specially limited in embodiments of this application.

The terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The processor may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 may be a cache. The memory may store instructions or data that are/is used by the processor 110 or that are/is used frequently. If the processor 110 needs to use the instructions or data again, the processor 110 may directly invoke the instructions or data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The processor 110 may be connected to modules such as a touch sensor, an audio module, a wireless communication module, a display, and a camera through at least one type of the foregoing interfaces.

The processor 110 is configured to implement the foregoing stylus detection method.

It can be understood that an interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiment or a combination of a plurality of interface connection manners.

A USB connector 130 is an interface complying with a USB standard specification, and may be configured to connect the terminal device 100 and a peripheral device, and may be specifically a Mini USB connector, a Micro USB connector, a USB Type C connector, or the like. The USB connector 130 may be configured to connect to a charger, so that the charger charges the terminal device 100, or may be configured to connect to another terminal device, so that data is transmitted between the terminal device 100 and the another terminal device. The USB connector 130 may alternatively be configured to connect to a headset, and output, by using the headset, audio stored in the terminal device. The connector may alternatively be configured to connect another terminal device, for example, a VR device. In some embodiments, a standard specification of the universal serial bus may be USB1.x, USB2.0, USB3.x, and USB4.

The charging management module 140 is configured to receive a charging input of the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 can be configured to cover one or more communication frequency bands. Different antennas may be multiplexed to improve antenna utilization. For example, the antenna 1 may be multiplexed as a diversity antenna in a wireless local area network. In some other embodiments, the antennas may be used in combination with a tuning switch.

The mobile communication module 150 may provide a wireless communication solution that is applied to the terminal device 100 and that includes 2G/3G/4G/5G and the like. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the terminal device 100 and that includes a wireless local area network (WLAN) (for example, a wireless fidelity (Wi-Fi) network), Bluetooth (BT), Bluetooth Low Energy (BLE), Ultra Wide Band (UWB), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communication module 150, and the antenna 2 is coupled to the wireless communication module 160, so that the terminal device 100 can communicate with a network and another terminal device by using a wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode ( ), a flexible light-emitting diode (FLED), a mini-LED, a micro-LED, a micro-OLED, a quantum dot light-emitting diode (QLED), or the like. In some embodiments, the terminal device 100 may include one or more displays 194.

The terminal device 100 may implement an audio function by using the audio module 170, the speaker 170A, the receiver 170B, the microphone 170C, the headset jack 170D, the application processor, and the like. For example, music playing, recording, playing a voice and a ring corresponding to an accurate attaching prompt, and playing a voice and a ring corresponding to a location adjustment prompt.

The audio module 170 is configured to convert digital audio information into an analog audio signal for output, and is also configured to convert analog audio input into a digital audio signal. The audio module 170 may be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The terminal device 100 may be used to listen to music or output an audio signal of a hands-free call through the speaker 170A.

The receiver 170B, also referred to as an "earpiece", is configured to convert an electrical audio signal into a sound signal. When a call is answered or voice information is received by using the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the terminal device 100 jitters, calculates, based on the angle, a distance for which a lens module needs to compensate, and controls the lens to cancel the jitter of the terminal device 100 through reverse motion, to implement image stabilization. The gyroscope sensor 180B may further be used in a navigation scenario and a somatic game scenario. The gyroscope sensor 180B may provide the foregoing second location information for the terminal device.

The magnetic sensor 180D includes a Hall effect sensor. The terminal device 100 may detect opening and closing of a flip cover by using the magnetic sensor 180D. When the terminal device is a foldable terminal device, the magnetic sensor 180D may be configured to detect folding or unfolding, or a folding angle of the terminal device. In some embodiments, when the terminal device 100 is a flip phone, the terminal device 100 may detect opening and closing of a flip cover based on the magnetic sensor 180D. Further, a feature such as automatic unlocking of the flip cover is set based on a detected opening or closing state of the leather case or a detected opening or closing state of the flip cover. The magnetic sensor 180D is further disposed at a location that is in the terminal device 100 and that corresponds to the first area 101, and is configured to detect the magnetic field intensity at the first area.

The acceleration sensor 180E may detect accelerations in various directions (usually on three axes) of the terminal device 100. A magnitude and a direction of gravity may be detected when the terminal device 100 is stationary. The acceleration sensor 180E may further be configured to identify a posture of the terminal device, and is used in an application such as switching between a landscape mode and a portrait mode or a pedometer.

The distance sensor 180F is configured to measure a distance. The terminal device 100 may measure a distance through infrared or laser. In some embodiments, in a photographing scenario, the terminal device 100 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The terminal device 100 emits infrared light outward by using the light-emitting diode. The terminal device 100 detects infrared reflected light from a nearby object by using the photodiode. When intensity of the detected reflected light is greater than a threshold, it may be determined that there is an object near the terminal device 100. When intensity of the detected reflected light is less than the threshold, the terminal device 100 may determine that there is no object near the terminal device 100. The terminal device 100 may detect, by using the optical proximity sensor 180G, that the user holds the terminal device 100 close to an ear for a call, to automatically turn off a screen for power saving. The optical proximity sensor 180G may also be used in a leather case mode or a pocket mode to automatically unlock or lock the screen.

The ambient light sensor 180L may be configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G in detecting whether the terminal device 100 is blocked, for example, the terminal device is in a pocket. When it is detected that the terminal device is blocked or in a pocket, some functions (for example, a touch function) may be disabled to prevent a misoperation.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature detected by the temperature sensor 180J exceeds a threshold, the terminal device 100 reduces performance of the processor, to reduce power consumption of the terminal device and implement thermal protection. In some other embodiments, when the temperature detected by the temperature sensor 180J is lower than another threshold, the terminal device 100 heats the battery 142. In some other embodiments, when the temperature is lower than still another threshold, the terminal device 100 may boost an output voltage of the battery 142.

The touch sensor 180K is also referred to as a "touch control device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in the headset, to combine into a bone conduction headset. The audio module 170 may parse out a speech signal based on the vibration signal obtained by the bone conduction sensor 180M from the vibration bone of the voice part, to implement a speech function. The application processor may obtain heart rate information through parsing based on the blood pressure beat signal obtained by the bone conduction sensor 180M, to implement a heart rate detection function.

The button 190 may include a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized. The motor 191 may perform vibration corresponding to the accurate attaching prompt, vibration corresponding to the location adjustment prompt, and the like.

The indicator 192 may be an indicator light, and may be configured to indicate a charging status and a power change, or may be configured to indicate a message, a missed call, a notification, and the like.

An embodiment of this application provides a stylus detection apparatus, including: a processor and a memory that is configured to store instructions that can be executed by the processor. The processor is configured to implement the foregoing method when executing the instructions.

An embodiment of this application provides a non-volatile computer-readable storage medium, where the storage medium stores computer program instructions; and when the computer program instructions are executed by a processor, the foregoing method is implemented.

An embodiment of this application provides a computer program product, including computer-readable code or a non-volatile computer-readable storage medium carrying computer-readable code. When the computer-readable code is run in a processor of a terminal device, the processor in the terminal device performs the foregoing method.

The computer-readable storage medium may be a tangible device that may retain and store instructions for use by an instruction execution device. The computer-readable storage medium may be, for example, but is not limited to an electronic storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read only memory (ROM), an erasable programmable read-only-memory (Electrically Programmable Read-Only-Memory, EPROM, or flash memory), a static random-access memory (SRAM), a portable compact disc read-only memory (CD-ROM), a digital video disc (DVD), a memory stick, a floppy disk, a mechanical coding device, for example, a punch card or a convex structure in a groove that stores instructions, and any suitable combination thereof.

The computer-readable program instructions or code described herein may be downloaded from the computer-readable storage medium to each computing/processing device or to an external computer or external storage device by using a network such as the Internet, a local area network, a wide area network, and/or a wireless network. The network may include a copper transmission cable, optical fiber transmission, wireless transmission, a router, a firewall, a switch, a gateway computer and/or an edge server. A network adapter card or a network interface in each computing/processing device receives the computer-readable program instructions from the network, and forwards the computer-readable program instructions for storage into the computer-readable storage medium in each computing/processing device.

The computer program instructions used to perform an operation in this application may be an assembly instruction, an instruction set architecture (ISA) instruction, a machine instruction, a machine-related instruction, microcode, a firmware instruction, status setting data, or source code or target code written in any combination of one or more programming languages. The programming languages include an object-oriented programming language such as Smalltalk or C++, and a conventional procedural programming language such as a "C" language or a similar programming language. The program-readable program instructions may be executed completely on the user computer, partially on the user computer, as an independent software package, partially on the user computer, partially on the remote computer, or completely on the remote computer or server. In a case involving a remote computer, the remote computer may be connected to the user computer by using any type of network, including a local area network (LAN) or a wide area network (WAN), or may be connected to an external computer (for example, using an Internet service provider to connect via the Internet). In some embodiments, an electronic circuit, for example, a programmable logic circuit, a field-programmable gate array (FPGA), or a programmable logic array (PLA), is customized by using status information of the computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable the computer, the programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or the block diagrams.

The computer-readable program instructions may alternatively be loaded onto the computer, the another programmable data processing apparatus, or the another device, so that a series of operation steps are performed on the computer, the another programmable data processing apparatus, or the another device to produce a computer-implemented process. Therefore, the instructions executed on the computer, the another programmable data processing apparatus, or the another device implements the functions/actions specified in the one or more blocks in the flowcharts and/or block diagrams.

The flowcharts and block diagrams in the accompanying drawings show the system architectures, functions, and operations that may be implemented by apparatuses, systems, methods, and computer program products according to various embodiments of this application. In this regard, each block in the flowcharts or block diagrams may represent a module, a program segment, or a part of an instruction, and the module, the program segment, or the part of the instruction includes one or more executable instructions for implementing a specified logical function. In some alternative implementations, functions marked in the blocks may also occur in a sequence different from that marked in the accompanying drawings. For example, two consecutive blocks may be actually executed substantially in parallel, or sometimes may be executed in a reverse order, depending on a function involved.

It should also be noted that each block in the block diagrams and/or the flowcharts, and a combination of blocks in the block diagrams and/or the flowcharts may be implemented by hardware (for example, a circuit or an ASIC (Application Specific Integrated Circuit, application specific integrated circuit)) that performs a corresponding function or action, or may be implemented by a combination of hardware and software, for example, firmware.

Although the present invention is described herein with reference to embodiments, in a process of implementing the present invention that seeks protection, a person skilled in the art may understand and implement other variations of the disclosed embodiments by viewing the accompanying drawings, disclosed content, and the appended claims. In the claims, the word "comprising" does not exclude another component or another step, and "a" or "one" does not exclude a case of a plurality of objects. A single processor or another unit may implement several functions enumerated in the claims. Some measures are recorded in dependent claims that are different from each other, but this does not mean that these measures cannot be combined to produce a good effect.

The foregoing has described embodiments of this application. The foregoing descriptions are examples, are not exhaustive, and are not limited to the disclosed embodiments. Many modifications and variations are apparent to a person of ordinary skill in the art without departing from the scope of the described embodiments. Selection of terms used in this specification is intended to best explain the principles of embodiments, actual application, or improvements to technologies in the market, or to enable another person of ordinary skill in the art to understand embodiments disclosed in this specification.

What is claimed is:

1. A method for stylus detection, applied to a terminal device, wherein a first area for attaching a stylus is provided on the terminal device, a magnetic attaching component for attaching and fastening the stylus to the first area is disposed in the stylus, and the method comprises:
   in response to detecting that an attaching object is attached and fastened to the first area, detecting the attaching object to obtain a detection result, wherein the detection comprises detecting whether an attaching location of the attaching object is accurate; and
   in response to determining that the detection result is a target detection result, providing a first prompt to remind a user that the attaching location of the attaching object that is attached and fastened to the first area is inaccurate, wherein the target detection result comprises that the attaching location of the attaching object is inaccurate.

2. The method according to claim 1, wherein the detection further comprises detecting whether the attaching object is the stylus, and the target detection result further comprises that the attaching object is the stylus.

3. The method according to claim 2, wherein the detection comprises a first detection step and a second detection step, the first detection step detects whether the attaching object is the stylus, and the second detection step detects whether the attaching location of the attaching object is accurate.

4. The method according to claim 3, wherein the second detection step is performed in response to determining that a first detection result of the first detection step is that the attaching object is the stylus.

5. The method according to claim 3, wherein the first detection step comprises:
   sending a private message to the attaching object, and monitoring a private reply message returned by the attaching object in response to the private message, and wherein that the attaching object is the stylus comprises: receiving the private reply message within a first preset time after the private message is sent.

6. The method according to claim 3, wherein the second detection step comprises:
   sending a connection diagnosis message to the attaching object, and monitoring a diagnosis reply message returned by the attaching object in response to the connection diagnosis message, wherein the connection diagnosis message comprises a wireless charging protocol message, and wherein that the attaching location of the attaching object is inaccurate comprises: skipping receiving the diagnosis reply message within a second preset time after the connection diagnosis message is sent.

7. The method according to claim 5, wherein the private message comprises a request to obtain first location information of the attaching object, and the private reply message comprises the first location information of the attaching object; and
   the sending a connection diagnosis message to the attaching object comprises:
   determining a relative location relationship between the attaching object and the terminal device based on the first location information; and
   sending the connection diagnosis message to the attaching object in response to determining that the relative location relationship meets a preset condition.

8. The method according to claim 7, wherein the preset condition comprises:
   in a reference coordinate system, a difference between coordinate values in at least one coordinate axis of first location coordinates of the attaching object and second location coordinates of the terminal device is less than or equal to a preset difference, wherein the first location coordinates are determined based on the first location information received within the first preset time.

9. The method according to claim 7, wherein the preset condition comprises:
   an actual spatial location of the attaching object is the same as a predicted spatial location of the stylus, wherein the actual spatial location is determined based on the first location information received within the first preset time, and the predicted spatial location of the stylus is determined based on second location information of the terminal device and third location information of the first area relative to the terminal device.

10. The method according to claim 1, wherein the providing a first prompt comprises at least one of the following operations:
    displaying the first prompt on a display of the terminal device;
    vibrating in a manner corresponding to the first prompt;
    ringing in a manner corresponding to the first prompt;
    flashing in a manner corresponding to the first prompt; or
    playing a voice corresponding to the first prompt.

11. A terminal device, wherein a first area for placing a stylus is provided on the terminal device, a magnetic attaching component for attaching and fastening the stylus to the first area is disposed in the stylus, and the terminal device comprises:
    an object detector, disposed at a location that is in the terminal device and that corresponds to the first area, and configured to detect whether an attaching object is attached and fastened to the first area; and
    at least one processor and at least one memory coupled to the at least one processor, wherein the at least one memory stores programming instructions for execution by the at least one processor to cause the terminal device to perform operations comprising:
    in response to detecting that an attaching object is attached and fastened to the first area, detecting the attaching object to obtain a detection result, wherein the detection comprises detecting whether an attaching location of the attaching object is accurate; and
    in response to determining that the detection result is a target detection result, providing at least one of a first prompt for reminding a user that the attaching location of the attaching object that is attached and fastened to the first area is inaccurate or a second prompt for reminding the user of a correct attaching location of the stylus, wherein the target detection result comprises that the attaching location of the attaching object is inaccurate.

12. The terminal device according to claim 11, wherein the detection further comprises detecting whether the attaching object is the stylus, and the target detection result further comprises that the attaching object is the stylus.

13. The terminal device according to claim 12, wherein the detection comprises a first detection step and a second detection step, the first detection step detects whether the attaching object is the stylus, and the second detection step detects whether the attaching location of the attaching object is accurate.

14. The terminal device according to claim 13, wherein the second detection step is performed in response to determining that a first detection result of the first detection step is that the attaching object is the stylus.

15. The terminal device according to claim 13, wherein the first detection step comprises:
sending a private message to the attaching object, and monitoring a private reply message returned by the attaching object in response to the private message, and wherein that the attaching object is the stylus comprises: receiving the private reply message within a first preset time after the private message is sent.

16. The terminal device according to claim 13, wherein the second detection step comprises:
sending a connection diagnosis message to the attaching object, and monitoring a diagnosis reply message returned by the attaching object in response to the connection diagnosis message, wherein the connection diagnosis message comprises a wireless charging protocol message, and wherein that the attaching location of the attaching object is inaccurate comprises: skipping receiving the diagnosis reply message within a second preset time after the connection diagnosis message is sent.

17. The terminal device according to claim 15, wherein the private message comprises a request to obtain first location information of the attaching object, and the private reply message comprises the first location information of the attaching object; and
the sending a connection diagnosis message to the attaching object comprises:
determining a relative location relationship between the attaching object and the terminal device based on the first location information; and
sending the connection diagnosis message to the attaching object in response to determining that the relative location relationship meets a preset condition.

18. The terminal device according to claim 17, wherein the preset condition comprises:
in a reference coordinate system, a difference between coordinate values in at least one coordinate axis of first location coordinates of the attaching object and second location coordinates of the terminal device is less than or equal to a preset difference, wherein the first location coordinates are determined based on the first location information received within the first preset time; or
an actual spatial location of the attaching object is the same as a predicted spatial location of the stylus, wherein the actual spatial location is determined based on the first location information received within the first preset time, and the predicted spatial location of the stylus is determined based on second location information of the terminal device and third location information of the first area relative to the terminal device.

19. The terminal device according to claim 11, wherein the providing a first prompt comprises at least one of the following operations:
displaying the first prompt on a display of the terminal device;
vibrating in a manner corresponding to the first prompt;
ringing in a manner corresponding to the first prompt;
flashing in a manner corresponding to the first prompt; or
playing a voice corresponding to the first prompt; and
wherein the providing a second prompt comprises:
displaying the second prompt on the display of the terminal device, and/or controlling an indicator light located in the first area to emit light.

20. A terminal device, wherein a first area for placing a stylus is provided on the terminal device, a magnetic attaching component for attaching and fastening the stylus to the first area is disposed in the stylus, and the terminal device comprises:
an object detector, disposed at a location that is in the terminal device and that corresponds to the first area, and configured to detect whether an attaching object is attached and fastened to the first area; and
at least one processor and at least one memory coupled to the at least one processor, wherein the at least one memory stores programming instructions for execution by the at least one processor to cause the terminal device to perform operations comprising:
in response to detecting that an attaching object is attached and fastened to the first area, detecting the attaching object to obtain a detection result, wherein the detection comprises detecting whether an attaching location of the attaching object is accurate; and
in response to determining that the detection result is a target detection result, providing a prompt to remind a user of a correct attaching location of the stylus, wherein the target detection result comprises that the attaching location of the attaching object of the attaching object that is attached and fastened to the first area is inaccurate.

* * * * *